United States Patent [19]

Mole et al.

[11] 3,916,000

[45] Oct. 28, 1975

[54] ALKYLATION PROCESS

[75] Inventors: Thomas Mole, East Melbourne; Aivars Meisters, North Coburg, both of Australia

[73] Assignee: Commonwealth Scientific and Industrial Research Organization, Campbell, Australia

[22] Filed: July 18, 1972

[21] Appl. No.: 272,946

[30] Foreign Application Priority Data

July 21, 1971 Australia.............................. 6531/71

[52] U.S. Cl........... 260/389; 260/290 R; 260/319.1; 260/650 R; 260/666 R; 260/666 M; 260/668 R; 260/676 R; 260/682
[51] Int. Cl.².......................................... C09B 11/04
[58] Field of Search............ 260/389, 650 R, 666 R, 260/666 M, 668 R, 676 R, 682

[56] References Cited

UNITED STATES PATENTS 2,180,762    11/1939    Meischer et al................... 260/389

Primary Examiner—Anton H. Sutto
Assistant Examiner—L. A. Thaxton
Attorney, Agent, or Firm—Bacon & Thomas

[57] ABSTRACT

The oxygen function of a carbinol, ketone, aldehyde or carboxylic acid radical in a compound is replaced a number of alkyl groups equal to the number of carbon-oxygen bonds in the radical by a method in which the aluminium carbinolate formed by reacting the compound with an aluminium trialkyl is heated, thereby to cleave the oxygen carbon bond of the carbinolate and replace the oxy-aluminium function by an alkyl group.

14 Claims, No Drawings

ALKYLATION PROCESS

This invention is concerned with a method of alkylating organic compounds and more specifically with a method whereby an oxygen function (as hereinafter defined) may be completely replaced by one or more alkyl groups.

Broadly stated the method of the invention involves the reaction of aluminium alkyls with carbinols, ketones, aldehydes and carboxylic acids and the simple derivatives of carboxylic acids, such as esters, anhydrides and acid chlorides to yield products, in which the oxygen function has been completely replaced by one, two or three alkyl groups depending on its nature. General equations for the transformations involved are:

$$R^1R^2R^3C-OH + AlR_3 \rightarrow R^1R^2R^3CR$$
$$R^1R^2C=O + AlR_3 \rightarrow R^1R^2CR_2$$
$$R^1CHO + AlR_3 \rightarrow R^1CHR_2$$
$$R^1COOH + AlR_3 \rightarrow R^1CR_3$$
$$R^1COOR^2 + AlR_3 \rightarrow R^1CR_3$$

(In the above formulae, $R^1$ $R^2$ and $R^3$ are organic radicals or hydrogen and R is an alkyl group.)

A significant side reaction which occurs is the formation of unsaturated compounds. Thus diphenylmethylcarbinol reacts with trimethylaluminium to give a mixture of 2,2-diphenylpropane (62%) and 1,1-diphenylethylene (15%):

$$Ph_2C(CH_3)OH \rightarrow Ph_2C(CH_3)_2 \text{ and } Ph_2C=CH_2$$

In some cases, therefore, the alkylated product may be mainly unsaturated and the method of the invention may be used to prepare such materials.

Although aluminium trialkyls are difficult materials to handle, being pyrophoric, and their use on large scale, therefore, would present hazards, the invention provides an elegant synthetic method which is useful in the synthesis of relatively small quantities of highly priced fine chemicals, such as pharmaceuticals.

DESCRIPTION OF THE PRIOR ART

There is apparently no prior publication in which the reactions of triorganoaluminiums with oxygen compounds give fully alkylated products. There are numerous reports of the formation of less than fully alkylated materials obtained by reaction of carbonyl and carboxylic compounds with organoaluminium compounds, but in no case has alkylation by triorganoaluminium compounds proceeded beyond the formation of a carbinol. Bruno[1] and Reinheckel, Haage and Jahnke[2] have recently reviewed these reactions.

1. G. Bruno, The Uses of Aluminum Alkyls in Organic Synthesis, Ethyl Corp. (1970). 2. H. Reinheckel, K. Haage anad D. Jahnke, Organometal.Chem. Rev.A 4 (1969) 47 et seq.

In effect, therefore, what is already known is that carbinols will react with aluminium alkyls to form carbinolates, e.g.

$$R^1R^2R^3COH + R_3Al \rightarrow R^1R^2R^3COAlR_2$$

The present invention is based on the discovery that when more drastic conditions of temperature are applied to such carbinolates, the C—O bond is cleaved and the oxy-aluminum function is replaced by an alkyl group. A good example is the pyrolysis of dimethylaluminium 1-adamantoxide.

$$Ad-O-Al(CH_3)_2 \rightarrow Ad-CH_3$$

(Ad = the 1-adamantyl radical)

In one respect, therefore, the present invention provides a method for replacing the oxygen function in a carbinol, ketone, aldehyde or carboxylic acid radical or a simple derivative of a carboxylic acid radical with a number of alkyl groups equal to the number of carbon-oxygen bonds in the radical, which method comprises heating an aluminium carbinolate, formed by reacting the radical with an aluminium trialkyl, at a temperature and for a time sufficient to cleave the oxygen-carbon bond of the carbinolate and replace the oxy-aluminium function by an alkyl group.

In another aspect, the invention provides a method for converting an organic compound containing the radical $$-\underset{|}{\overset{|}{C}}-OH,$$

$>C=O$, $-CH=O$, $-COOH$ or $-COX$, where X is the residue of an ester, anhydride or acid chloride, to a compound containing the radical $$-\underset{|}{\overset{|}{C}}-R,$$

$>CR_2$, $-CHR_2$, $-CR_3$ or $-CR_3$ respectively where R is an alkyl group, which method comprises heating an aluminium carbinolate, formed by the reaction of the radical with an aluminium trialkyl, and heating the carbinolate at a temperature and for a time sufficient to complete the reaction.

In another aspect, the invention provides a method for providing an organic compound of the general formula $R^1R^2R^3CR$, $R^1R^2CR_2$, $R^1CHR_2$ or $R^1CR_3$, where $R^1$ $R^2$ and $R^3$ are each hydrogen or an organic radical and R is an alkyl group, which comprises heating an aluminium carbinolate, formed by the reaction of an aluminium trialkyl of the formula $AlR_3$, where R is an alkyl group, with an oxy-compound of the general formula $R^1R^2R^3C-OH$, $R^1R^2C=O$, $R^1CH=O$, or $R^1COOH$ or $R^1COX$ (where X is the residue of an ester, acid anhydride or acid halide group) respectively, to a temperature and for a time sufficient to cleave the oxygen-carbon bond of the carbinolate and replace the oxy-aluminium function by an alkyl group R.

In some cases, the pyrolytic reaction on the aluminium carbinolate results in elimination, as well as alkylation, to form an unsaturated product.

$$R_2C(CH_3)OALR'_2 \rightarrow R_2C=CH_2 \text{ and } R_2C(CH_3)R'$$

This can sometimes be used as a means of making unsaturated compounds.

In each of the aspects defined above, the invention may also include the step of converting the radical or oxycompound to the carbinolate.

However, in practice, it is unnecessary and undesirable to isolate the aluminium carbinolate, which may be readily prepared in situ by the action of a trialkylaluminium on a carbinol, ketone, aldehyde, acid or one of their simple derivatives. In the case of carbonyl or carboxyl compounds, the formation of the aluminium carbinolate proceeds by alkylation or sometimes by reduction.

$$R^1\underset{\overset{\|}{O}}{C}-R^2 + R_3Al \rightarrow R^1-\underset{\overset{|}{OAlR_2}}{\overset{|}{C}}-R^2 \quad \text{or} \quad R^1\underset{\overset{|}{OAlR_2}}{\overset{|}{C}H}-R^2$$

$$R^1\underset{\overset{\|}{O}}{C}-H + R_3Al \rightarrow R^1\underset{\overset{|}{OAlR_2}}{\overset{|}{C}}-H \quad \text{or} \quad R^1-\underset{\overset{|}{OAlR_2}}{\overset{|}{C}H_2}$$

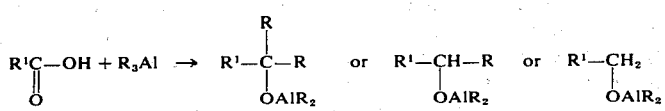

An excess of trialkylaluminium is especially useful in facilitating the conversion of carbinolate to alkylated product (or sometimes olefin). It also facilitates the formation of carbinolate from carbonyl or carboxylic compounds.

The reaction of carbinolate displays autocatalytic character and is responsive to varying catalysts, in particular water, carboxylic acids or hydrogen sulphide.

A special feature of the reaction when unsaturated products form as a by-product, is the occasional incorporation of that by-product into the process. If desired, however, an olefin may be deliberately introduced into the reaction so that the alkylation will at least partly involve the olefin. Thus 4,4'-dichlorobenzyhydrol will react with trimethylaluminium in presence of added α-methyl styrene to give 1,1-bis-p-chlorophenyl-3-methyl-3-phenylbutane.

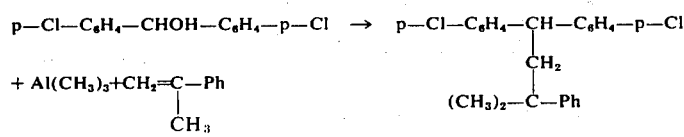

Scope of the Reaction

It will be appreciated that the method of the invention is of extremely wide applicability and, subject to the limitations set out below, can be used with any organic compound containing the specified oxygen function, provided of course that the aluminium trialkyl reagent does not undergo undesired reactions with other radicals present in the compound. As indicated below, even if two oxygen functions are present, it may be possible to convert either one or both of these to the desired alkyl group. For this reason, therefore, the examples of compounds given herein must only be construed as exemplary and not as limiting the invention in any way.

The following are examples of compounds which undergo the reaction of this invention:

a. Carbinols: Hydroxy compounds in which the OH is not joined directly to an aromatic (including aromatic heterocyclic) ring. These include straight or branch-chain saturated or unsaturated aliphatic and cycloaliphatic alcohols, such as ethanol, i-butanol, t-butanol, n-heptanol, 1-adamantol, cyclohexanol, undecanol, geraniol, aryl and heterocyclic carbinols, including substituted aryls and heterocyclics such as phenyl methyl carbinol, benzhydrol, diphenyl methyl carbinol, phenyl diethyl carbinol, triphenyl carbinol, p-chlorophenyl methyl carbinol, m-methoxyphenyl methyl carbinol, furfuryl alcohol and 2-(2-pyridyl)ethanol.

b. Ketones: Straight or branched chain, saturated or unsaturated, aliphatic and cycloaliphatic ketones, aralkyl and diaryl ketones, with or without ring substituents, heterocyclic and substituted heterocyclic ketones. Examples are acetone, hexanones, 2-octanone, cyclohexanone, dicyclopropyl ketone, phenyl cyclopropyl ketone, cycloheptanone, adamantanone, acetophenone, propiophenone, methylacetophenones, methoxyacetophenones, benzophenone, dimethylbenzophenones, p-acetoxyacetophenone, tetralone, indanone and 3-cholestanone.

c. Aldehydes: Straight or branched chain, saturated or unsaturated, aliphatic and cycloaliphatic, aryl, substituted aryl, heterocyclic and substituted heterocyclic aldehydes. Examples are acetaldehyde, heptaldehyde, citral, pivalaldehyde, benzaldehyde, p-chlorobenzaldehyde, p-ethoxybenzaldehyde, naphthaldehyde and furfural. The simple derivatives of ketones and aldehydes, such as acetals and ketals, can often be used in place of the free ketones and aldehydes, but there is usually no advantage in this.

d. Carboxylic Acids: As for aldehydes. Examples are acetic, pivalic, n-butyric, palmitic, stearic, oleic, undecylenic, benzoic, salicylic, naphthoic, bromobenzoic, abietic, cinnamic, picolinic, indoleacetic and pyromucic acids. Alkyl and aryl esters, such as methyl, butyl, phenyl esters and the like, may be used in the place of the acids themselves, as may also anhydrides and acid chlorides.

In all cases, there may be more than one of the oxygen functional groups present, either the same or different. For example glycerol, succinic acid, tartaric acid, terephthalic acid, hydroxymethylfurfural etc. Reaction may or may not occur on all of the oxygen groups present.

Aluminium Alkyls

These are the trialkyl and triaralkyl aluminium compounds. The alkyl groups may include straight and branched chain, saturated and unsaturated groups up to about $C_{20}$, and they may be substituted with simple aryl groups such as phenyl, naphthyl etc. Mixed alkyl and aralkyl compounds are also envisaged. Typical compounds are thus trimethyl-aluminium, triethyl-aluminium, tripropyl-aluminium, triisobutyl-aluminium, tridecyl-aluminium, dimethyl-phenylethynyl-aluminium, dimethyl-benzyl-aluminium etc.. In some reactions, mixed products may be obtained by adding two alkyl aluminiums to the mixture either simultaneously or consecutively.

As indicated above, mostly complete alkylation of the oxygen-containing compound is achieved. In some cases, elimination of the oxyaluminium group from the intermediate carbinolate may lead to the formation of an unsaturated compound.

e.g. 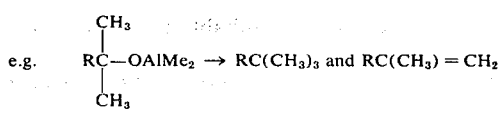

Thus a carboxylic acid reacted with trimethylaluminium may produce a t-butyl compound, together with an iso-propenyl compound

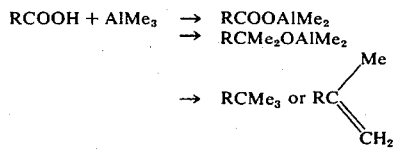

In a further aspect of the invention, therefore, the stated process can, therefore, in some cases, be used to produce largely an alkylated product which is unsaturated. Very often the formation of the isopropenyl group occurs where steric hindering makes the formation of a t-butyl group difficult.

Reaction Conditions

In general, the reaction is carried out by heating the compound containing the oxygen function, together with the aluminium alkyl, in a suitable solvent or even without a solvent, for sufficient time to substantially complete the reaction.

Trialkylaluminium compounds are highly reactive towards air and moisture, and care must be taken to protect reactions from the atmosphere. Reactions are carried out under an atmosphere of nitrogen. On a small scale, the aluminium compounds are conveniently handled and introduced by means of hypodermic syringe. Such small-scale experiments are best carried out by adding one reactant dissolved in a suitable solvent by syringe to the other in a pre-necked, serum-capped and nitrogen-flushed glass ampoule. After any initial alkane evolution, the ampoule is sealed and introduced into a steel bomb containing solvent of a suitable boiling point to approximately equalize the pressure inside and outside of the tube. The bomb is then heated in an oven at the requisite temperature. Finally the ampoule is cooled in liquid nitrogen and opened, and its contents are hydrolyzed, e.g. by using dilute aqueous mineral acid.

Larger scale experiments which require prolonged heating may be carried out in an open flask with a sealed-on water-condenser, again serum-capped and nitrogen-flushed. Here a hydrocarbon or chlorinated aromatic hydrocarbon of suitable high boiling point may be used or (less commonly) the reaction can be conducted in the absence of solvent. Again the reactants may be added to the apparatus by syringe, or by siphon under a pressure of inert gas. Reaction is conducted by heating in an oil-bath to the requisite temperature whilst a stream of nitrogen is passed through a T-piece at the open end of the condenser.

Hydrolysis presents some problems due to the reactivity of the residual organoaluminum compounds. Working up is therefore commonly and satisfactorily carried out by slowly pipetting the reaction products into a mixture of ether and aqueous HCl (in some cases NaOH) in a separating funnel topped by a reflux water-condenser. Evolved alkane and refluxing ether then maintain an inert atmosphere during hydrolysis.

More specific reaction conditions are outlined below.

i. Carbinols

The most reactive carbinols are the tertiary aralkyl compounds such as triphenyl carbinol, phenyl dimethyl carbinol or diphenyl methyl carbinol. Triphenyl carbinol is especially reactive. Higher temperatures are required for other $\alpha$-aryl carbinols.

Purely aliphatic alcohols are less reactive. Of these the t-alcohols are most reactive. Primary alcohols require usually very drastic conditions.

Phenolic groups do not react up to the decomposition temperature of the aluminum alkyls.

The reaction may proceed with as little as one mole of trialkyl-aluminum per mole of carbinol. In practice, an excess of the aluminium compound, up to 2 moles per mole of carbinol is generally desirable as it allows more moderate temperatures to be used and can give higher yield. Greater amounts do not interfere with the reaction but are wasteful.

ii. Ketones

Ketones react readily with alkyl aluminiums to form t-carbinolates and complete alkylation to gem-dialkyl compounds is readily achieved using two moles or more of the aluminum compound. As with carbinols, excess of trialkyl aluminium may be used.

iii Aldehydes

In general complete alkylation of aldehydes is more difficult. Aliphatic aldehydes require drastic conditions and give only moderate yields, but aromatic aldehydes respond to more moderate conditions. The requirements of aluminium compound are as for ketones.

iv. Acids

Complete alkylation to tertiary carbon compounds has been found to proceed more readily from a carboxylic acid than from any other type of compound. Aliphatic, aromatic and heterocyclic carboxylic acids all react readily. Some substituted aryl acids react satisfactorily, such as those containing halogen, phenolic, alkoxy, etc. groups. Unsaturated acids give expected products but some rearrangement products may be formed when the double bond is close to the carboxyl group. More remote double bonds mostly emerge unscathed.

The ease of reaction of carboxylic acids is thought to be due to autocatalysis through the formation of an oxyaluminium compound.

v. Carboxylic Acid Derivatives

Esters, acid chlorides etc. do not react as readily as the free acids, probably because autocatalysis is not possible with such derivatives. The amount of unsaturated product obtained may be greater than when the free acid is used.

Reaction Variables

Commonly a hydrocarbon solvent is used, benzene or toluene being well suited. Other aromatic hydrocarbons may be employed as may liquid paraffin hydrocarbons such as isopentane, hexane and higher homologues, petroleum fractions, and kerosene, as well as halogenated solvents such as chlorobenzenes. Basic solvents very often have a retarding effect on the reaction. In many cases the solvent can be dispensed with and the reactants heated together.

The temperature at which the final reaction should be carried out varies considerably, depending upon the type of carbinol, the particular alkylating agent, the amount of alkylating agent, and in particular the use or otherwise of catalyst, as described later. In general reaction beyond the stage of carbinol formation does not occur below 70°–80°. More usually temperatures of around 100°–200° up to the decomposition point of the aluminium alkyl are required for the final reaction. Reaction times vary also according to the reactants and the conditions. The reaction is usually slow, requiring typically from 10 to 60 hours uncatalysed. Shorter or longer times are sometimes suitable.

The reaction is sensitive to certain materials which can retard, or catalyse it. Lewis bases in general have a retarding effect. Amines, such as triethylamine can increase the reaction time considerably as can ethers such as diethyl ether and anisole. On the other hand, the reaction rate can be considerably increased by certain reagents. These appear to act by producing a catalytic aluminum compound. Water, acetic acid or other acids, salts of acids, peroxides such as benzoyl peroxide are very effective catalysts. It is thought that these materials result in the formation of oxyaluminium compounds, such as as bis(dialkylaluminium)oxide $R_2Al—O—AlR_2$ or a polymeric alkylaluminum oxide $(RAlO)_n$. Thus addition of small amounts of water catalysed the alkylation of dimethylphenylcarbinol to t-butylbenzene, no reaction being observed at 90° within 27 hours in the absence of water while 2.3 mole % of water led to complete reaction within 23 hours. Similarly acids such as acetic acid or benzoic acid are very effective catalysts. Sulphur compounds may also be effective as catalysts, e.g. hydrogen sulphide and dibenzoyl sulphide.

Aluminium Alkyls

Trimethyl aluminium is the most useful alkylating agent, in particular because it is free of any action as a reducing agent. Higher alkylaluminiums suffer from this disadvantage and it is found that these reagents tend to produce mixtures of alkanes on reaction with carbinols, carbonyl and carboxy compounds. In this respect, reduction side reactions are more likely when higher alkylaluminiums are used with tertiary carbinols than with secondary carbinols.

Uses of the Process

The process of this invention provides a useful and often exclusive, method of preparing fully alkylated compounds for readily available compounds such as alcohols, ketones, aldehydes, acids, etc. Thus antioxidant products such as t-butyl phenols, t-butyl anisoles etc. are readily obtained from carboxylic acids and trimethyl-aluminium. A wide variety of alkyl-substituents can be introduced into chemical structures and this is particularly useful in preparing fine chemicals, drugs, insecticides and the like.

The practice of invention is further demonstrated and elucidated by the following examples. It will be appreciated that many of these examples describe laboratory-scale preparations and, hence, the techniques stated may not be applicable to larger scale manufacture. Nevertheless, aside from the usual considerations involved in the scale-up of chemical reaction systems the reactions stated are also suitable for use on larger scales.

In the examples all melting points are in degrees centigrade and are uncorrected.

EXAMPLE 1 a. Dimethylaluminium 1-Adamantoxide

Trimethylaluminium (270 mg; 3.75 mmole) in benzene was added dropwise to 1-adamantanol (500 l mg: 3.3 mmole) suspended in benzene (1 ml). Heat and methane was evolved. The product was pumped dry to give white dimethylaluminium 1-adamantoxide, m. 328°–330° (sealed tube in vacuo).

b. Pyrolysis of Dimethylaluminium 1-Adamantoxide

Dimethylaluminium 1-adamantoxide (60mg, i.e. 0.29 mmole) was sealed under nitrogen in a glass tube (50 × 6 mm) which was completely enclosed by a metal block and heated to 385°. After 10 min at this temperature the tube was half-withdrawn from the block. A colorless distillate collected at the cool end of the tube and solidified to 1-methyladamantane (39 mg, i.e. 90% yield), m.p. 97°–101°, 98% pure by g.l.c* and identical with the product obtained in example 2, below. (* gas-liquid chromatography)

EXAMPLE 2

Methylation of 1-Adamantanol

Trimethylaluminium (4.7 g; 65 mmole) in benzene (5 ml) was added slowly to adamantan-1-ol (4.5 g) in benzene (7 ml) in a thick-walled ampoule, which was sealed and heated at 200° for 64 hours within a steel bomb. The ampoule was then frozen in liquid nitrogen, broken at the tip and allowed to slowy warm up. The resulting white suspension was pipetted into a mixture of dilute aqueous HCl and benzene. The benzene layer was separated. Most of the solvent was removed by distillation and the crude product was isolated by g.l.c.

The 1-Methyladamantane (3.68g; 83% yield) thus isolated had m.p. 97°–100°. Found: 87.85; H, 11.95%; Calc. for $C_{11}H_{18}$; C, 87.92; H, 12.08%. The proton magnetic resonance (p.m.r.) spectrum in $(CCl_4)$ showed a sharp singlet at 0.77 ppm, broad multiplets at 1.46 and 1.67 ppm. and an even broader peak at 1.75–2.05 ppm in the intensity ratio 1: 2 : 2 : 1. The mass spectrum showed a parent ion of m/e 150 and a most intense ion of m/e 135 (i.e. adamantyl cation).

EXAMPLE 3

Pyrolysis of Diethylaluminium 1-Adamantoxide

This alkoxide, prepared from 1-adamantanol (85mg ie. 0.53 mmole) and triethylaluminium (71 mg, i.e. 0.62 mmole) in petrol in the manner described in Example 1a, was heated in a sealed glass tube to 280°–350°. Hydrolysis and g.l.c. then showed adamantane and 1-ethyladamantane to be present in approximately equal amounts.

EXAMPLE 4

Preparation and Pyrolysis of Dimethylaluminum Triphenylcarbinolate

Triphenylcarbinol (0.646 g) was added to a solution of trimethylaluminum (0.279g) in ether (4 ml) in an ampoule. Methane was evolved. The ampoule was sealed and heated at 90° for 6 hours. Large colorless crystals of dimethylaluminium triphenylcarbinolate (0.54g) formed, and were washed with ether and recrystallised from benzene. This product could be handled readily in the open, but rapidly decomposed on heating to 157–8° to give a solid plus a pale yellow liquid, which was distilled in vacuo and recrystallized from light petroleum to give 1,1,1-triphenylethane, m.p. 90–1° undepressed on admixture with an authentic sample.

EXAMPLE 5

Reaction of Carbinols with Trimethylaluminium

A number of carbinols were reacted with trimethylaluminum according to the following general method:

A solution of the carbinol in benzene was added to trimethylaluminium in an ampoule. When methane evolution was complete the ampoule was sealed and heated for 16 hours or more. The contents of the ampoule were hydrolysed by aqueous hydrochloric acid. The benzene layer was separated and dried over sodium sulphate. The product was obtained by evaporation of the benzene, sometimes after chromatography on alumina. Details of the reactions and the products obtained are set out in Table I.

EXAMPLE 8

Methylation of Acetophenone

Acetophenone (0.30 mmole) in benzene was added slowly to trimethylaluminium (0.85 mmole) in benzene in an ampoule, which was then sealed and heated. No t-butylbenzene was formed during 100 minutes at 80°, but after 65 hours at 122° p.m.r. spectroscopy showed t-butylbenzene to be present in 75% yield.

EXAMPLE 9

Methylation of Other Ketones

The methylation of other ketones to gem-dimethyl compounds was investigated by p.m.r. spectroscopy. The ketone (0.3 to 0.5 mmole) in benzene (ca. ½ ml) was added to trimethylaluminium (1 mmole) in benzene (0.5 ml) in a p.m.r. tube, which was then sealed and heated. Formation of gem-dimethyl compound was ascertained from the appearance of an appropriate singlet peak in the p.m.r. spectrum. The results obtained are summarized in Table II.

TABLE I

| Carbinol | Mole Ratio Me$_3$Al/Carbinol | Time - Temp | Product (Yield) |
| --- | --- | --- | --- |
| Triphenyl carbinol | 1.4:1 | 19 hr - 80° (in toluene) | 1,1,1-Triphenylethane (86%) |
| Diphenyl methyl carbinol | 1.5:1 | 20 hr - 85° | 2,2-Diphenylpropane (62%) |
| | | | 1,1-diphenylethylene (15%) |
| Phenyl dimethyl carbinol | 3.4:1 | 24 hr - 126° | t-Butylbenzene (73%) |
| 2-Octanol | 2:1 | 17 hr - 180° | 2-Methyloctane (35%) |
| Benzyl alcohol | 2.3:1 | 16 hr - 120° | Ethyl benzene (60%) |
| t-Butanol | 3.6:1 | 80 hr - 175° | Neopentane (45%) |

TABLE II

| Ketone | Mole Ratio Me$_3$Al/Ketone | Time - Temp | Product (Yield) |
| --- | --- | --- | --- |
| Acetone | 3.6:1 | 80 hr 175° | Neopentane (55%) |
| 2-Octanone | 2.1:1 | 18 hr 175° | 2,2-dimethyloctane (80%) |
| Cyclohexanone | 2.3:1 | 40 hr 175° | 1,1-dimethylcyclohexane (70%) |

EXAMPLE 6

Reaction of p,p'-Dichlorobenzhydrol with Triisobutylaluminium.

Triisobutylaluminium (230 mg; 1.16 mmole) in benzene was added to p,p'-dichlorobenzhydrol (118 mg; 0.47 mmole) in an ampoule, which was sealed and heated overnight at ca. 170°. Hydrolysis by dil. aq. HCl gave 124 mg of product shown by p.m.r. spectroscopy and g.l.c. to be a mixture of p,p'-dichlorodiphenylmethane (42–44%) and 1,1-di-p-chlorophenyl-3-methylbutane (54–56%).

EXAMPLE 7

Preparation of 1-Ethyladamantane

Triethylaluminium (2.35g; 21 mmole) in benzene (2 ml) was added slowly to 1-adamantanol (1.16 g; 7.6 mmole) in benzene (2 ml) in an ampoule, which was then sealed and heated in a bomb at 184° for 71 hours. The product was hydrolyzed in an ether -aq. HCl mixture. A low yield of 1-ethyladamantane was isolated from a large amount of unchanged 1-adamantanol.

EXAMPLE 10

Reaction of Triethylaluminium with Benzophenone

A 10% solution of triethylaluminium in benzene added slowly to a 35% solution of benzophenone in benzene until a mole ratio of triethylaluminium to benzophenone of 2.25:1 was reached. The resulting solution was then heated in a sealed tube up to 176° and then hydrolyzed using 2N aqueous hydrochloric acid. Little dialkylation product was formed. The product consisted of ca. 50% 1,1-di-phenylpropane formed by a sequence of ethylation and reduction or vice versa. In addition there was obtained 40% of 1,1-diphenylpropene-1 formed by ethylation-dehydration.

EXAMPLE 11

Preparation of 1,1-Diphenyl-3-methylbutane

Triisobutylaluminium did not dialkylate benzophenone, but readily reduced the benzophenone to benzhydrol.

When 5.7 moles of triisobutylaluminium was used per mole of benzophenone for 51 hours at 165°–170°, the benzhydrol was further alkylated to give 1,1-diphenyl-3-methylbutane in 53% yield.

EXAMPLE 12

Methylation of Benzaldehyde

Trimethylaluminium and benzaldehyde in a mole ratio of 2.5:1 were heated in benzene for 16 hours at 120°. Hydrolysis then gave a quantitative yield of isopropylbenzene.

EXAMPLE 13

Reaction of Benzaldehyde with Triethylaluminium

Benzaldehyde (6 mmoles) in benzene (3 ml) was added slowly to a cooled solution of triethylaluminium (2.24g; 20 mmole) in benzene (2 ml) in an ampoule. The ampoule was sealed and heated at 157° for 64 hours. Its contents were then hydrolyzed using dil. aq. HCl and the organic layer was examined by g.l.c. The products were 3-phenylpentane accompanied by a lower (ca. ⅓) amount of 1-phenylpropane, 160 mg (20% yield) of the former and 40 mg of the latter were trapped by glc and were identified by mass spectra and p.m.r. spectra.

EXAMPLE 14

Reaction of Benzaldehyde with Triethylaluminium and Then Trimethylaluminium

Benzaldehyde (6 mmole) in benzene (1 ml) was added slowly to triethylaluminium (10 mmole) in benzene (1 ml) in an ampoule. Trimethylaluminium (15 mmole) in benzene (1 ml) was then added. The ampoule was sealed and heated 17 hours at 180°. Then the contents were hydrolyzed and the ether-soluble product was analyzed by glc. 1-Phenylpropane, 2-phenylbutane and 3-phenylpentane were found in 2 : 3 : 2 ratio, and were isolated and characterised spectroscopically.

EXAMPLE 15

Methylation of Acetic Acid

Trimethylaluminium and acetic acid (mole ratio 6.5:1) were heated in toluene at 127–8° for 23 hours when reaction was 95% complete. Hydrolysis and separation of the products by g.l.c. gave a 60% yield of neopentane

EXAMPLE 16

Methylation of Pivalic Acid

In a reaction similar to Example 15, pivalic acid in benzene heated with trimethylaluminium for 60 hours at 145° yielded 58% of 2,2,3,3-tetramethylbutane and 42% of 2,3,3-trimethylbutene-1.

EXAMPLE 17

Methylation of Benzoic Acid

Trimethylaluminium (4.5 g; i.e. 63 mmole) was added to a suspension of benzoic acid (1.71g, i.e. 14 mmole) in isopentane in a magnetically stirred flask under a nitrogen atmosphere. Vigorous methane evolution ensued. After addition was complete the isopentane was boiled off by warming gently. Vigorous reaction (conversion of carboxylate to alkoxide) then occurred causing the excess trimethylaluminium to reflux. The flask was kept at 130°–150° for 24 hours under an air condenser, during which time the clear solution became a thick white suspension. Isopentane (15 ml) was added, and water (ca. 1 ml) was added very slowly and cautiously to hydrolyse the methylaluminium compounds, the flask being cooled intermittently using a dry ice-acetone bath. Hydrolysis was completed using dil. aq. HCl. Distillation gave t-butylbenzene (1.09g; 58% yield), b. 169°.

EXAMPLE 18

Methylation of 1-Naphthoic Acid

Trimethylaluminium (3.45 g; i.e. 48 mmole) in benzene (5 ml) was added slowly to 1-naphthoic acid (1.65 g; i.e. 9.6 mmole) in benzene (5 ml) in an ampoule. The ampoule was sealed once methane evolution ceased, and was then heated at 165° for 18 hours. Hydrolysis with 2N aq. HCl and extraction with benzene gave 1.70 g of crude liquid product, shown by glc to consist of 1-t-butylnaphthalene (76%), 1-isopropenylnaphthalene (13%) and ca. 11% of other products. Distillation (124°/4mm) gave a mixture of 1-t-butylnaphthalene (1.25 g) and 1-isopropenylnaphthalene (0.19 g).

EXAMPLE 19

Methylation of Palmitic Acid

Trimethylaluminium (1.88g; i.e. 26 mmole) in benzene (5 ml) was added very slowly to palmitic (hexadecanoic) acid (1.48g; i.e. 5.8 mmole) in benzene (5 ml) in a thick-walled ampoule at room temperature. After methane evolution ceased, the ampoule was sealed and heated at 127° for 4 hours.

Hydrolysis by 2N. aq. HCl and extraction with benzene-ether gave 1.52 g of liquid products, shown by g.l.c. to consist of 91% 2,2-dimethylheptadecane. (Found: C,84.73; H, 15.26%; Calculated for $C_{19}H_{40}$; C,84.98; H, 15.02%.)

EXAMPLE 20

Methylation of Stearic Acid

Trimethylaluminium (1.23 g; 16.9 mmole) in benzene was added to stearic acid (0.96 g; containing $C_{16}$, $C_{14}$ and $C_{12}$ homologues) in benzene in an ampoule. After methane evolution was complete the ampoule was sealed and heated to 128° for 40 hours. The contents of the ampoule were hydrolyzed using 2N aq. HCl to give 682 mg (ca. 75% yield) of liquid product which was mainly 2,2-dimethylnonadecane characterised by p.m.r. and mass spectra and by microanalysis.

EXAMPLE 21

Methylation of Oleic Acid

Trimethylaluminium (176 mg; 2.4 mmole) in benzene (0.4 ml) was added slowly to oleic acid (138 mg. i.e. 0.49 mmole) in benzene in an n.m.r. tube. After methane evolution ceased, the tube was sealed and heated at 120° for 15 hr. The contents were hydrolyzed using 2N aq. HCl. The benzene extract was chromatographed from a very short column of alumina, to give first 129 mg of crude oil from which was isolated 120 g of cis-18, 18-dimethylnonadec-9-ene. (Found: C, 85.36; H, 13.87%; Calc. for $C_{21}H_{42}$. C, 85.63; H, 14.37%), characterised by infra-red, p.m.r. and mass spectra.

EXAMPLE 22

Methylation of Undecylenic Acid

Trimethylaluminium (3.53 g; ie. 49 mmole) was added dropwise to stirred undecylenic acid (2.0 g; 11 mmole) in isopentane at dry-ice temperature. After methane evolution ceased, the reactants were allowed to warm up and then reacted exothermally causing all the isopentane to boil off. Further heating at 140–155° for 16 hours gave a white suspension which was diluted with benzene, hydrolyzed with dil. aq. HCl, separated and distilled to give a pale yellow oil, b. 104°/3mm (1.80 g) which was analyzed by g.l.c. and found to contain 65% by weight of 11,11-dimethyldodec-1-ene.

EXAMPLE 23

Methylation of o-Bromobenzoic Acid

Trimethylaluminium (1.13 g 16 mmoles) in benzene was added to o-bromobenzoic acid (0.625 g; 3.1 mmole) in benzene in an ampoule, which was sealed when methane evolution was complete then heated to 142°–150° for 16 hours. Hydrolysis by 2N aq. HCl and extraction with benzene gave 0.592 g of liquid shown by g.l.c. to consist of 68 mole% o-bromo-t-butylbenzene, 30 mole% o-bromoisopropenylbenzene and 2% unidentified material. G.l.c. allowed the separation of the o-bromo-t-butylbenzene (0.272g; 41% yield) and o-bromoisopropenylbenzene (0.088g; 14% yield).

EXAMPLE 24

Methylation of m-Chlorobenzoic Acid.

Trimethylaluminium (2.38g ie. 33 mmole) was added dropwise to a suspension of m-chlorobenzoic acid (1.48 g, 9.5 mmole) in isopentane at dry-ice-acetone temperature. After methane evolution ceased, the mixture was allowed to warm to room temperature, when exothermic reaction occurred causing the isopentane to boil out. The reactants were then heated to 140°–150° for 3½ hours to give a thick, white suspension, which was diluted with isopentane and hydrolyzed by pipetting into a mixture of isopentane and aqueous hydrochloric acid. The organic layer was distilled to give 1.21 g of distillate, b.p. 90°/11 mm, and 0.35g of residue (mainly dimeric m-chloroisopropenyl benzene). The distillate was shown to consist of two components: m-chloro-t-butylbenzene and m-chloroisopropenylbenzene in 4:1 ratio, thus indicating a 62% yield of the t-butyl compound. The components were separated and then characterized spectroscopically.

EXAMPLE 25

Methylation of 5-Chloro-3-phenylsalicyclic Acid

A solution of trimethylaluminium (6.0g; 80 mmole) in benzene was added slowly to 5-chloro-3-phenylsalicyclic acid (3.43g; 13.8 mmole) in benzene in an ampoule. After methane was evolved, the ampoule was sealed and heated at 150° for 40 hours. Hydrolysis by 2N aq. HCl and extraction with benzene gave 3.56g of crude product which was chromatographed from alumina.

Benzene eluted 3-t-butyl-5-chlorobiphenyl-2-ol (912 mg; 25% yield), b. 111°/0.15 mm; $n_D^{25}$1.5831 as a pale yellow liquid. Found: C, 73.47; H, 6.64; Cl, 13.6%; Calc. for $C_{16}H_{17}OCl$: C, 73.70; H. 6.57; Cl. 13.59%.

EXAMPLE 26

Methylation of Adamantane-1-carboxylic Acid

Trimethylaluminium (4.84 g, 67 mmole) in isopentane was added slowly to adamantane-1-carboxylic acid (2.40 g, 13.3 mmole) in isopentane in a thick-walled ampoule. When methane evolution ceased the ampoule was sealed and heated at 150° for 22 hours. The contents were then hydrolyzed using aqueous sodium hydroxide. Extraction with ether yielded 2.4 g of liquid product consisting of 35% 1-t-butyladamantane and 65% 1-isopropenyladamantane. These components were separated and characterised spectroscopically.

EXAMPLE 27

Methylation of Fluorene-9-Carboxylic Acid

Trimethylaluminium (130 mg; 1.8 mmole) was added to fluorene-9-carboxylic acid (71 mg, 0.34 mmole) in benzene in an ampoule. After methane evolution the tube was sealed and heated first to 128° for 78 hours then to 150° for 3 hours. Hydrolysis by 2N aqueous HCl gave 71 mg of a pasty solid, the three largest components of which were separated and indentified as:
9-isopropenylfluorene (39% by wt);
9-methyl-9-isopropylfluorene (27%);
9-t-butylfluorene (18%)

EXAMPLE 28

Methylation of Cinnamic Acid

Trimethylaluminium (0.974g; 13.2 mmole) in benzene was added slowly to cinnamic acid (0.444g; 3.0 mmole) in benzene in an ampoule, which was sealed after methane evolution was complete and heated for 4 hrs at 148°. The contents were then hydrolyzed by 2N aq. HCl. G.l.c. indicated that the crude product consisted of 28% trans-1-phenyl-3,3-dimethylbutene-1 and 72% of 2-methyl-4-phenylpentene-2 and allowed separation of 65 mg (14% yield) of the former and 209 mg (44%) of the latter.

EXAMPLE 29

Reaction of Methyl Benzoate with Trimethylaluminium

Methyl benzoate (0.42 mmole) heated in a sealed tube with trimethylaluminium (2.03 mmole) at 120° was completely reacted after 74 hours. Hydrolysis of the reaction mixture gave a product which was found to contain t-butylbenzene and α-methylstyrene in a 1:5 ratio.

EXAMPLE 30

Incorporation of an Olefin During Alkylation 4,4'-Dichlorobenzhydrol (2.53g) and α-methylstyrene (2 ml) in benzene in a thick walled ampoule were treated with trimethylaluminium (1.5g) added very slowly. Vigorous evolution of methane occurred during the addition. The ampoule was then sealed and heated for 18 hours at 170°. The contents were then hydrolysed with hydrochloric acid and the crude product was fractionally distilled under high vacuum. The middle fraction gave a product identified as 1,1-bis-p-chlorophenyl-3-methyl-3-phenylbutane.

Examples 31 to 37 illustrate the effect of catalysts on increasing the rate of reaction.

EXAMPLE 31

Catalysed Reaction of Di-p-tolyl ketone with Trimethylaluminium

A few mg of benzoic acid (catalyst) and then solid di-p-tolyl ketone (2.5 g: 12 mmole) were added slowly to trimethylaluminium (2½ml; 25 mmole) in dodecane (4½ml). Exothermic reaction at once ensued and then, as the reactants were heated (magnetic stirring) under a reflux condenser at 170° for 2½ hours, a white ppt steadily developed. The suspension of products was pipetted into a mixture of ether and aq. HCl in a dropping funnel under a reflux condenser; the ethereal extract was separated, dried and distilled to give an oil (2.0 g), b. 310°. This crystallised to a pasty solid, shown by p.m.r. to consist of 86% 2,2-di-p-tolylpropane (i.e. 63% yield) and 14% of 1,1-di-p-tolylethylene. The 2,2-di-p-tolylpropane was recrystallised from methanol to m. 77°–77.5°.

EXAMPLE 32

Catalyzed Methylation of Di-p-tolyl Ketone Without Solvent

To trimethylaluminium (2.1 ml, 21 mmole) was added slowly first a few mg of benzoic acid and then di-p-tolyl ketone (1.4g, 6.7 mmole). Exothermic reaction occurred at once. The stirred reactants were then heated under a reflux condenser first at 130°–5° for 3 hours and then at 150° for 4 hours. The thick white suspension so formed was diluted with ether and then hydrolyzed as in the previous example 31, to give 1.4 g of a colorless oil shown to be a 1:1 mixture of 2,2-di-p-tolylpropane and 1,1-di-p-tolylethylene.

EXAMPLE 33

Methylation of 1-Indanone

A few mg of benzoic acid and 1-indanone (1.75g; 13 mmole) were added to trimethylaluminium (3.0 ml; 30 mmole) in chlorobenzene (4.5 ml). Immediate exothermic reaction occurred. The stirred mixture was heated under a reflux condenser for 17 hours at 180° (the chlorobenzene refluxed continually) and the gelatinous yellow product was then pipetted into a mixture of ether and aq. HCl. The ethereal extract was separated, dried and twice distilled to give liquid (1.15 g), b. 170°, shown by g.l.c. to consist of ca. 90% 1,1-dimethylindane.

EXAMPLE 34

Catalysed Methylation of 2,5-Dichloroacetophenone.

To stirred trimethylaluminium (2.6 ml; 26 mmole) in an ampoule was added first a few mg of benzoic acid and then slowly 2,5-dichloroacetophenone (2.05 g) in benzene (3 ml). The transient yellow colour ketone complex showed more tendency than usual to persist. The ampoule was sealed and heated at 180° for 82 hours. The solid reaction product was then diluted with ether and pipetted into a mixture of ether and aq. HCl. The ether layer was separated, dried and distilled to give 1.90 g distillate, b. ca. 230°, shown by p.m.r. spectroscopy and g.l.c. to consist of a mixture of 2,5-dichloro-t-butyl-benzene (70%, ca. 60% yield) and 2,5-dichloro-α-methylstyrene (30%).

EXAMPLE 35

Catalysed Methylation of Dicyclopropyl Ketone

Dicyclopropyl ketone (1.5 ml; ie. 1.41 g or 12.8 mmole) was added to a magnetically stirred solution of trimethylaluminium (3.0 ml; 30 mmole) in p-dichlorobenzene (5½ g solvent). Vigorous reaction occurred. A few mg of benzoic acid (catalyst) was added, and the reactants were heated under a reflux condenser first to 130–5° for 5½ hours, then to 150° for 4 hours.

The products were diluted with ether then hydrolyzed by pipetting into a mixture of ether and aq. HCl. The ether layer was separated, dried and three times distilled to give 0.93 g of distillate containing 82% by wt. (ie. 0.77 g) of 2,2-dicyclopropylpropane and 18% p-dichlorobenzene.

EXAMPLE 36

Methylation of Cycloheptanone

To trimethylaluminium (2.6 ml; 26 mmole) in an ampoule was added first a few mg of benzoic acid, then dropwise, with cooling by water, a solution of cycloheptanone (1.25 g) in benzene (2.5 ml). Copious gas evolution suggested the occurrence of enolization and condensation reactions. The ampoule was sealed, enclosed in a benzene-containing steel-bomb and heated at 180° for 82 hours. The solid product was diluted with ether and pipetted into a mixture of ether and aq. HCl. The ether layer was separated, dried and distilled to give 0.90g of distillate b. 140°, shown by glc to contain a little benzene, 50–60% 1,1-dimethylcycloheptane (ie. ca. 35% yield) and about 25–35% of methylcycloheptene, and/or methylenecycloheptane.

EXAMPLE 37

Reaction of Trimethylaluminium with Heptaldehyde (Acetic Acid Catalyzed)

A mixture of heptaldehyde (773 mg; 6.8 mmole) and acetic acid (9 mg) in benzene (1 ml) was added slowly to trimethylaluminium (1.56g; 21 mmole) in benzene (3 ml) in an ampoule, which was sealed and heated for 17 hours at 180°. Hydrolysis by dil. aq. HCl gave an organic product which was distilled to give a fraction (0.34 g) with two components — the major 2-methyloctane and the minor apparently a mixture of octenes.

The effect of inhibitors on the reaction is shown by the following two examples.

EXAMPLE 38

Effect of Triethylamine on the Methylation of 2-Phenylpropan-2-ol

To 2-phenylpropan-2-ol plus a few mole percent of triethylamine in a p.m.r. tube was added trimethylaluminium (2.4 moles per mole of carbinol) in benzene. The tube was sealed and heated and the spectrum was scanned for replacement of the C-methyl peak of the carbinol by the C-methyl peak of t-butylbenzene. Reaction occurred during 21 hours at 130° but not during 86 hours at 110°. In a control experiment in which triethylamine was absent, complete reaction occurred during 86 hours at 110°. Thus triethylamine appreciably retards methylation.

EXAMPLE 39

Effect of Ether on the Methylation of 2-Phenylpropan-2-ol

2-Phenylpropan-2-ol (43 mg; 0.32 mmole) and diethyl ether (23.5 mg, 0.32 mmole) in benzene were added to trimethylaluminium (61 mg; 0.85 mmole) in benzene (total vol. of benzene, 0.7 ml) in a p.m.r. tube which was sealed, heated and examined by p.m.r. spectroscopy. Only very small amounts of t-butylbenzene and α-methylstyrene were formed during 71 hours at 150°. Additional heating at 175° (20 hrs) and 193° (20 hours) produced the following products in the estimated yields shown.

|  | 175° | 193° |
|---|---|---|
| t-butylbenzene | 16% | 52% |
| α-methylstyrene | 30% | 44% |
| unreacted carbinolate | 54% | 4% |

By comparison the reaction goes readily in the absence of ether at 126°C to give 73% of t-butylbenzene as shown in Table I.

I claim:

1. A method which comprises heating an aluminium carbinolate, formed by the reaction of an organic oxy compound selected from the group consisting of straight or branched chain, saturated or unsaturated, alphatic, cycloaliphatic, aryl and substituted aryl carbinols, straight or branched chain, saturated or unsaturated, aliphatic and cycloaliphatic ketones, aralkyl and diaryl ketones, ring substituted aralkyl ketones, ring substituted diaryl ketones, straight or branched chain, saturated or unsaturated, aliphatic and cycloaliphatic aldehydes, aryl, substituted aryl aldehydes, carboxylic acids, alkyl or aryl esters thereof and acid halides, with an aluminium trialkyl, wherein alkyl contains up to twenty carbon atoms and may be substituted by phenyl, or naphthyl, at pyrolysis temperature to cleave the oxygen-carbon bond of the carbinolate and replace the oxy-aluminum function by alkyl as defined above.

2. A method as claimed in claim 1 wherein a catalyst is added to the said mixture.

3. A method as claimed in claim 2, wherein the catalyst is selected from the class consisting of water, acids, salts of acids, peroxides and sulphides.

4. The method of claim 1, wherein the aluminum carbinolate is formed in the presence of a solvent.

5. The method of claim 1, wherein the solvent is selected from the group consisting of hydrocarbon and halogenated hydrocarbon solvents.

6. The method of claim 1, wherein the pyrolysis temperature is in the range of from 70°C to the decomposition temperature of the aluminum trialkyl.

7. The method of claim 1, wherein the trialkyl aluminum is present in excess of the organic oxygen-containing compound.

8. The method of claim 1, wherein the carbinol is ethanol, i-butanol, t-butanol, n-heptanol, 1-adamantanol, cyclohexanol, undecanol, geraniol, phenyl methyl carbinol, benzhydrol, diphenyl methyl carbinol, phenyl diethyl carbinol, triphenyl carbinol, p-chlorophenyl methyl carbinol, and m-methoxyphenyl methyl carbinol.

9. The method of claim 1, wherein the ketone is selected from the group consisting of acetone, hexanones, 2-octanone, cyclohexanone, dicyclopropyl ketone, phenyl cyclopropyl ketone, cycloheptanone, adamantanone, acetophenone, propiophenone, methylacetophenones, methoxyacetophenones, benzophenone, dimethylbenzophenones, p-acetoxyacetophenone, tetralone, and 3-cholestanone.

10. The method of claim 1, wherein the aldehyde is selected from the group consisting of acetaldehyde, heptaldehyde, citral, pivalaldehyde, benzaldehyde, p-chlorobenzaldehyde, p-ethoxybenzaldehyde, and naphthaldehyde.

11. The method of claim 1, wherein the acid is selected from the group consisting of acetic, pivalic, n-butyric, palmitic, stearic, oleic, undecylenic, benzoic, salicylic, naphthoic, bromobenzoic, abietic, cinnamic, picolinic, indoleacetic and pyromucic acids.

12. The method of claim 1, wherein aluminum trialkyl is selected from the group consisting of trimethyl-aluminum, triethyl-aluminum, tripropyl-aluminum, triisobutyl-aluminum, tridecyl-aluminum and dimethyl-benzyl-aluminum.

13. The method of claim 1, wherein a mixture of at least two aluminum trialkyl compounds are reacted to form the aluminum carbinolate.

14. A method for methylation of triphenyl carbinol comprising reacting triphenyl carbinol with trimethyl-aluminum in an organic solvent and heating the reaction mixture until 1,1,1-triphenylethane is formed.

* * * * *